US011158151B2

(12) United States Patent
DiFatta et al.

(10) Patent No.: US 11,158,151 B2
(45) Date of Patent: Oct. 26, 2021

(54) SYSTEMS AND METHODS FOR NESTING CUPS FROM A DISPENSER

(71) Applicant: Cornelius, Inc., Osseo, MN (US)

(72) Inventors: Vincenzo DiFatta, Wood Dale, IL (US); Christopher F. Zemko, Elgin, IL (US); Clayton Knight, South Elgin, IL (US); Jeremy Nocchi, Crystal Lake, IL (US); James Bendig, Naperville, IL (US)

(73) Assignee: Cornelius, Inc., Osseo, MN (US)

( * ) Notice: Subject to any disclaimer, the term of this patent is extended or adjusted under 35 U.S.C. 154(b) by 89 days.

(21) Appl. No.: 16/799,097

(22) Filed: Feb. 24, 2020

(65) Prior Publication Data

US 2020/0273283 A1  Aug. 27, 2020

Related U.S. Application Data

(60) Provisional application No. 62/810,579, filed on Feb. 26, 2019, provisional application No. 62/810,575, filed on Feb. 26, 2019.

(51) Int. Cl.
| | |
|---|---|
| *G07F 13/10* | (2006.01) |
| *G07F 11/02* | (2006.01) |
| *B65G 59/10* | (2006.01) |

(52) U.S. Cl.
CPC .............. *G07F 13/10* (2013.01); *G07F 11/02* (2013.01); *B65G 59/10* (2013.01)

(58) Field of Classification Search
CPC .......... G07F 13/10; G07F 11/02; B65G 59/10
See application file for complete search history.

(56) References Cited

U.S. PATENT DOCUMENTS

| | | | | |
|---|---|---|---|---|
| 1,666,008 | A | * | 4/1928 | Graffenberger ...... B65G 59/105 221/221 |
| 2,227,196 | A | | 12/1940 | Nicholson |

(Continued)

FOREIGN PATENT DOCUMENTS

| | | |
|---|---|---|
| GB | 786882 | 11/1957 |
| WO | 2014115073 A1 | 7/2014 |

(Continued)

*Primary Examiner* — Michael Collins
(74) *Attorney, Agent, or Firm* — Andrus Intellectual Property Law, LLP (57) ABSTRACT

A dispensing system for dispensing containers. The dispensing system includes a storage chamber configured to hold the containers available for dispensing. A release device is coupled to the storage chamber to release the containers therefrom. An input device is configured to receive an order to dispense specific containers from the containers stored within the storage chamber, where the specific containers include at least two individual containers having different shapes. A tray receives the specific containers released from the storage, where the specific containers when released form a nested stack on the tray, and where the nested stack has a stacked height. A control system is operative coupled to the input device and the release device, where the control system determines a sequence for dispensing the specific containers from the order so as to minimize the stacked height of the nested stack on the tray.

20 Claims, 9 Drawing Sheets

(56) References Cited

U.S. PATENT DOCUMENTS

| | | | |
|---|---|---|---|
| 3,000,408 A * | 9/1961 | Vischer, Jr. | G07F 13/10 |
| | | | 141/174 |
| 3,460,593 A | 8/1969 | Niehaus et al. | |
| 4,195,751 A | 4/1980 | Smith | |
| 4,989,753 A | 2/1991 | Brogna et al. | |
| 4,991,741 A * | 2/1991 | Anderson | B65G 59/106 |
| | | | 221/223 |
| 5,058,630 A | 10/1991 | Wiley et al. | |
| 5,261,467 A * | 11/1993 | Yamamoto | G07F 13/10 |
| | | | 141/174 |
| 7,100,796 B1 * | 9/2006 | Orr | G07F 9/10 |
| | | | 141/174 |
| 7,308,916 B2 * | 12/2007 | Akuzawa | G07F 13/10 |
| | | | 141/172 |
| 7,731,058 B2 * | 6/2010 | Stamatis Filho | A47F 1/085 |
| | | | 221/221 |
| 8,757,222 B2 | 6/2014 | Rudick et al. | |
| 8,972,048 B2 | 3/2015 | Canora et al. | |
| 9,067,775 B2 | 6/2015 | Mattos, Jr. et al. | |
| 9,250,256 B2 * | 2/2016 | Lukhaub | G01N 35/04 |
| 9,327,958 B2 * | 5/2016 | Angus | B67D 1/0041 |
| 9,384,621 B1 * | 7/2016 | Chang | G07F 13/10 |
| 9,840,407 B2 | 12/2017 | DiFatta et al. | |
| 9,886,185 B2 | 2/2018 | Abrach et al. | |
| 10,031,505 B2 | 7/2018 | Martindale et al. | |
| 10,059,581 B2 | 8/2018 | Peters et al. | |
| 10,140,602 B2 | 11/2018 | Kelly et al. | |
| 10,155,651 B2 | 12/2018 | Keating et al. | |
| 10,354,477 B2 * | 7/2019 | Magno | G07F 13/065 |
| 10,373,276 B2 | 8/2019 | Carpenter et al. | |
| 2002/0014495 A1 * | 2/2002 | Sato | G07F 13/10 |
| | | | 221/191 |
| 2008/0164274 A1 * | 7/2008 | Stettes | A47J 31/401 |
| | | | 221/5 |
| 2016/0376140 A1 | 12/2016 | Tansey, Jr. | |
| 2019/0259077 A1 | 8/2019 | Cuppari et al. | |
| 2019/0300357 A1 | 10/2019 | Crawford et al. | |

FOREIGN PATENT DOCUMENTS

| | | |
|---|---|---|
| WO | 2017192871 A1 | 11/2017 |
| WO | 2018089460 A1 | 5/2018 |
| WO | 2018140546 A1 | 8/2018 |

* cited by examiner

SYSTEMS AND METHODS FOR NESTING CUPS FROM A DISPENSER

CROSS REFERENCE TO RELATED APPLICATIONS

The present application is based on and claims priority to U.S. Provisional Patent Application Ser. Nos. 62/810,575 and 62/810,579, each filed Feb. 26, 2019, the disclosures of which is incorporated herein by reference.

FIELD

The present disclosure generally relates to systems and methods for nesting cups from a dispenser, and more particularly to systems and methods for nesting cups from a dispenser to minimize a stack height thereof.

BACKGROUND

The Background and Summary are provided to introduce a foundation and selection of concepts that are further described below in the Detailed Description. The Background and Summary are not intended to identify key or essential features of the potentially claimed subject matter, nor are they intended to be used as an aid in limiting the scope of the potentially claimed subject matter.

The following U.S. patents are incorporated herein by reference:

U.S. Pat. No. 9,840,407 discloses a beverage dispensing system that includes a plurality of beverage sources each containing a beverage component, and at least one flow valve connected to one or more of the beverage sources and operable to control a flow of the beverage component therefrom. The system further includes a graphical display that presents a plurality of available beverages and a gesture capture device that receives a selection gesture input to select a beverage from the plurality of available beverages. A controller is also included that adjusts the at least one flow valve based on the selection gesture input to dispense the selected beverage.

U.S. Pat. No. 9,886,185 discloses systems and method for beverage dispensing to a plurality of users, which includes a beverage dispenser with a touch-sensitive graphical display. A computer of the beverage dispenser receives touch event data points and identifies one or more GUI sections of a plurality of GUI sections associated with the received touch event data points. The computer further operates to interpret a touch event input and provide a command responsive to the input to an associated dispensing unit.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a dispensing system for dispensing containers. The dispensing system includes a storage chamber configured to hold the containers available for dispensing. A release device is coupled to the storage chamber to release the containers therefrom. An input device is configured to receive an order to dispense specific containers from the containers stored within the storage chamber, where the specific containers include at least two individual containers having different shapes. A tray receives the specific containers released from the storage, where the specific containers when released form a nested stack on the tray, and where the nested stack has a stacked height. A control system is operative coupled to the input device and the release device, where the control system determines a sequence for dispensing the specific containers from the order so as to minimize the stacked height of the nested stack on the tray.

Another embodiment generally relates to a method for dispensing containers, the method including storing containers available for dispensing within a storage chamber and operatively coupling a release device with the storage chamber to release the containers therefrom. The method further includes providing an input device configured to receive an order to dispense specific containers from the containers stored within the storage chamber, where the specific containers include at least two individual containers having different shapes. The method further includes providing a tray that receives the specific containers released from the storage, where the specific containers when released form a nested stack on the tray, and where the nested stack has a stacked height. The method further includes operatively coupling a control system to the input device and the release device, and configuring the control system to determine a sequence for dispensing the specific containers from the order to minimize the stacked height of the nested stack on the tray.

Another embodiment generally relates to a dispensing system for dispensing beverage cups. The dispensing device includes a storage chamber configured to hold the beverage cups available for dispensing. A release device is coupled to the storage chamber to release the beverage cups therefrom. An input device is configured to receive an order to dispense specific cups from the beverage cups stored within the storage chamber, where the specific cups include at least two individual cups having different heights. A tray receives the specific containers released from the storage, where the specific cups when released form a nested stack on the tray, where the nested stack has a stacked height, and where the nested stacked height varies depending on a sequence in which the specific cups are nested. A tilting device tilts the tray between a first position for receiving the specific cups from the storage chamber, and a second position for subsequently presenting the specific cups to a purchaser, where the nested stack has an upper end and a lower end, and where the upper end is tilted away from the dispensing device when the tray is tilted to the second position. A funnel guides the specific cups between the release device and the tray, where the funnel has an upper end having an upper width and a lower end having a lower width, and where the upper width is greater than the lower width, where the funnel causes the upper end of each of the specific cups to be tilted rearwardly while being guided in the funnel. A control system is operative coupled to the input device and the release device. The control system determines the sequence for dispensing the specific cups from the order so as to minimize the stacked height of the nested stack on the tray.

Various other features, objects and advantages of the disclosure will be made apparent from the following description taken together with the drawings.

BRIEF DESCRIPTION OF THE DRAWINGS

The drawings illustrate embodiments for carrying out the disclosure. The same numbers are used throughout the drawings to reference like features and like components. In the drawings.

DETAILED DISCLOSURE

This written description uses examples to disclose embodiments of the present disclosure and also to enable any person skilled in the art to practice or make and use the same. The patentable scope of the invention is defined by the potential claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The present inventors have identified problems within the food and beverage industry, including the dispensing of containers or cups to be filled with food or beverage products. Many retailers secure cups and containers by retaining them behind a purchasing counter, manually distributing such cups at the time of purchase. However, the present inventors have identified that it would be desirable to allow for unattended cup dispensing, while nonetheless providing security such that a cup cannot be obtained without purchase.

Figure 1:
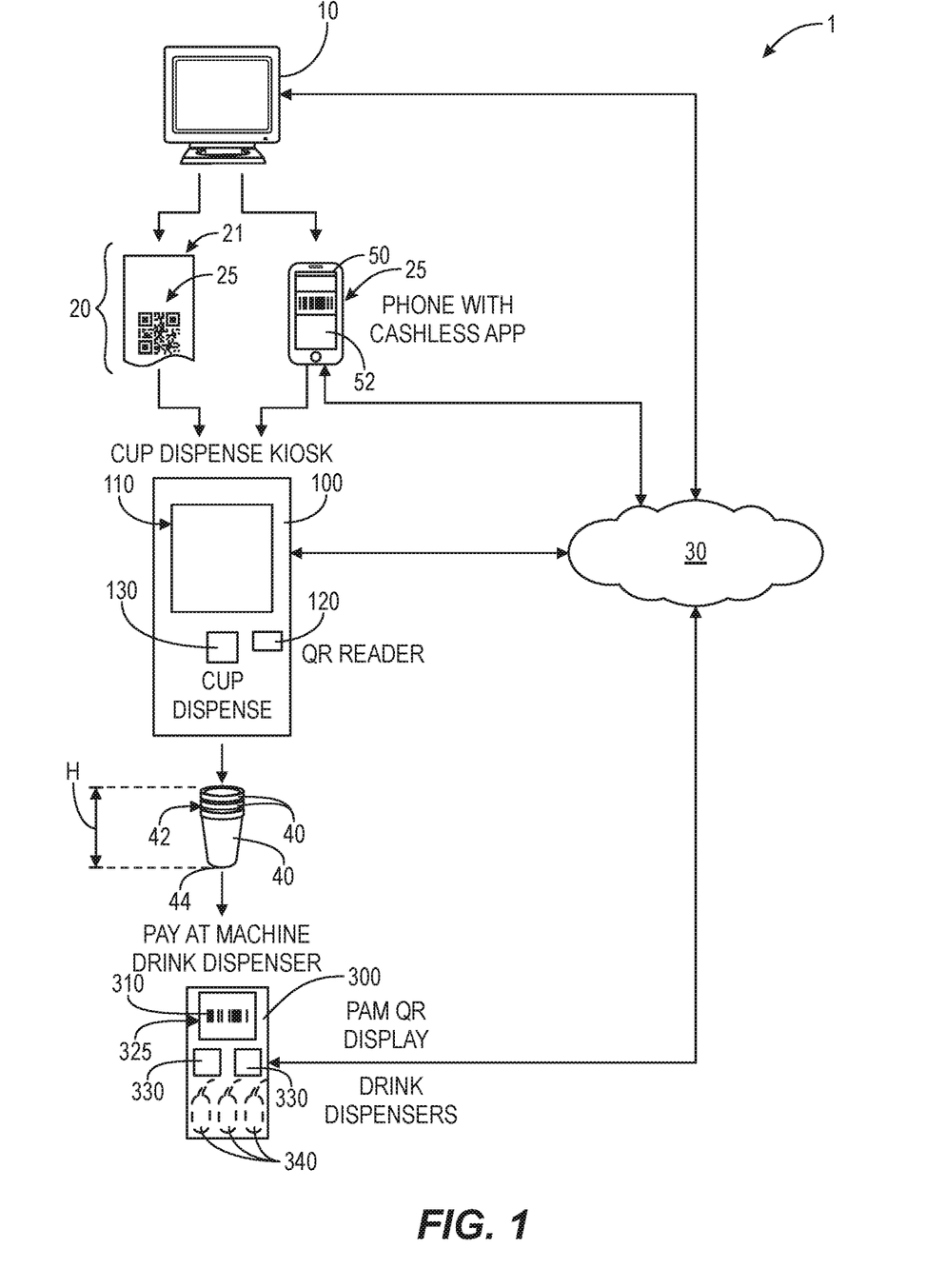
FIG. 1 is a schematic depiction of an exemplary embodiment of a system for purchasing beverages, dispensing cups, and dispensing beverages into the cups.

FIG. 1 depicts an exemplary system 1 for purchasing, dispensing, and filling a container, such as a cup, according to the present disclosure. For simplicity, all containers (whether for foods, beverages, or other products) are referred to herein as cups 40 for beverages. In the system 1 shown, a customer purchases a beverage requiring a cup 40 at a payment system 10, such as a standard POS cash register. Upon receiving payment, a receipt 20 is provided, such as a paper receipt 21 or a digital receipt on the user interface 52 of a mobile device 50. In certain examples, the receipt 20 incorporates a proof of purchase 25. In the examples shown in FIG. 1, the proof of purchase 25 is a QR code for the paper receipt 21, and a traditional barcode for the mobile device 50. Other exemplary proofs of purchases 25 include alpha-numeric codes, logos or pictures, or an image of the customer's face. For example, certain embodiments provide that an image of the customer's face is used as the proof of purchase 25, which can later be recognized as the receipt 20 for dispensing cups and/or beverages (in other words, no tangible receipt 20 is provided).

In the system 1 of FIG. 1, the customer then takes the receipt 20 (which may be their own face as discussed above) to a cup dispensing system 100, shown here to be a stand-alone kiosk, to receive one or more cups 40 based on the order purchased at the payment system 10. The cup dispensing system 100 may include a display or user interface 110 for displaying information to the user. This information may provide instructions for using the cup dispensing machine, relate to the customer's order, and/or include static or video advertising for other goods and services provided by the vendor or outside parties.

FIG. 1 further shows an example of the system 1 in which the payment system 10, mobile device 50, and/or cup dispensing system 100 (as well as the beverage dispensing system 300 discussed below), are configured to communicate via a cloud 30 based network known in the art. In certain examples, the cloud 30 principally connects these devices, whereas in others the cloud 30 also contains a control system for storing data and/or processing orders. An exemplary control system 140 is discussed below and shown in FIG. 5.

The cup dispensing system 100 of FIG. 1 further includes an input device 120 configured to read or otherwise identify indicia, which includes the proof of purchase 25. As stated above, reading this proof of purchase 25 may entail scanning a paper receipt 21 or mobile device 50 (e.g. the mobile device 25 itself, such as NFC or Bluetooth®, or something displayed on its screen), taking an image of the person using the cup dispensing system 100 for comparison, or other actions to receive and/or input the proof of purchase 25. Exemplary input devices 120 include optical cameras, barcode scanners, fingerprint scanners, and NFC and/or RFID readers.

In the example shown in FIG. 1, after the input device 120 of the cup dispensing system 100 reads an indicia, the indicia is compared with a database of outstanding proofs of purchases 25 from the payment system 10 to determine if a match is present. This comparison may be made by a control system 140 (FIG. 5) within the cup dispensing system 100, the cloud 30, and/or elsewhere in the system 1. Additional information regarding the control system 104 is provided below. If a match is confirmed, the cup dispensing system 100 dispenses one or more cups from the cup dispense location 130 in accordance with the order corresponding to the matching proof of purchase 25. In this manner, the system 1 confirms that the indicia scanned is not just any QR code, and that even if the scanned indicia at one point corresponded to a valid proof of purchase 25, the corresponding order has not already been filled or otherwise voided.

Each cup 40 within the cup dispensing system 100 has an upper end 42 and a lower end 44, resulting in a stacked height H of one or more cups 40 when nested together. As will be discussed below, the cup dispensing system 100 may dispense the cups 40 so as to provide a minimum stacked height H when the cups 40 are nested together.

Once the cups 40 have been dispensed from the cup dispensing system 100, the customer takes the one or more cups 40 to a beverage dispensing system 300. As stated above, it should be recognized that the beverage dispensing system 300 need not literally dispense beverages (shown as 340), but may dispense soft-serve ice cream, frozen yogurt, or popcorn, for example. It should further be recognized that the payment system 10, cup dispensing system 100, and/or beverage dispensing system 300 may be integrated into combined devices, such as a cup dispensing system 100 that also functions as the payment system 10 and/or as the beverage dispensing system 300, for example.

The beverage dispensing system 300 of FIG. 1 also includes a display or user interface 310. In certain examples, the user interface 310 displays an indicia 325 that can be scanned by a mobile device 50 to initiate communication therebetween. In other words, after the mobile device 50

(and/or the cloud 30) registers that a purchase has been made via a payment system 10, certain embodiments allow the customer to use a mobile device 50 to scan the indicia 325 of a beverage dispensing system 300 from which the customer wishes to fill the cup 40. This allows purchasing and/or cup distribution to occur remotely from the beverage dispensing system 300, and also allows for configurations in which there are multiple beverage dispensing systems 300 for a customer to choose from.

The beverage dispensing system 300 may also or alternatively incorporate an input device (not shown) similar to the input device 120 of the cup dispensing system 100. This would allow the customer to scan the proof of purchase 25 on a paper receipt 21 or mobile device 50 to initiate communication with the beverage dispensing system 300. It will be recognized that this proof of purchase 25 may be the same one provided via the payment system 10, or a new one provided via the cup dispensing system 100 (e.g. via a printer associated therewith). The proof of purchase 25 may also be provided on the cup 40 dispensed, for example.

Whether an indicia 325 associated with the beverage dispensing system 300 is scanned, or the beverage dispensing system 300 scans an indicia provided by the customer (such as the proof of purchase 25), the system 1 then determines whether there is a corresponding order that is fillable at that beverage dispensing system 300. Once again, and as discussed further below, this determination is made by a control system 140 within the beverage dispensing system 300 and/or the cloud 30 or other devices within the system 1. If the system 1 determines that the scanned indicia 325 of the beverage dispensing system 300, or the indicia scanned by the beverage dispensing system 300, corresponds to or matches a valid proof of purchase 25, the beverage dispensing system 300 is permitted to dispense the appropriate beverages. Limitations may be provided with respect to the time, volume, and/or type of beverage allowed to be dispensed. This may also include age-controlled limitations, such as only dispensing alcohol-containing beverages into special cups 40.

In this manner, the system 1 provides for dispensing a cup 40 by receiving a purchase request at the payment system 10 to purchase the cup 40, generating a receipt 20 indicating the cup 40 was purchased, and scanning an indicia with an input device 120 associated with the cup dispensing system 100, whereby scanning the indicia also indicates a request by the customer to dispense the cup 40 at a particular cup dispensing system 100. From here, the cup dispensing system 100 determines (via the control system 140 discussed below) whether the scanned indicia matches a proof of purchase 25 associated with the receipt 20, dispensing the cup 40 only when the indicia matches the proof of customer 25. The customer may then take the cup 40 to a beverage dispensing system 300 (which as stated about may be the same device as the payment system 10 and/or the cup dispensing system 100) to confirm the order and fill the cup 40 with the beverage at the fill location 330 in the manner discussed above.

Figure 2:
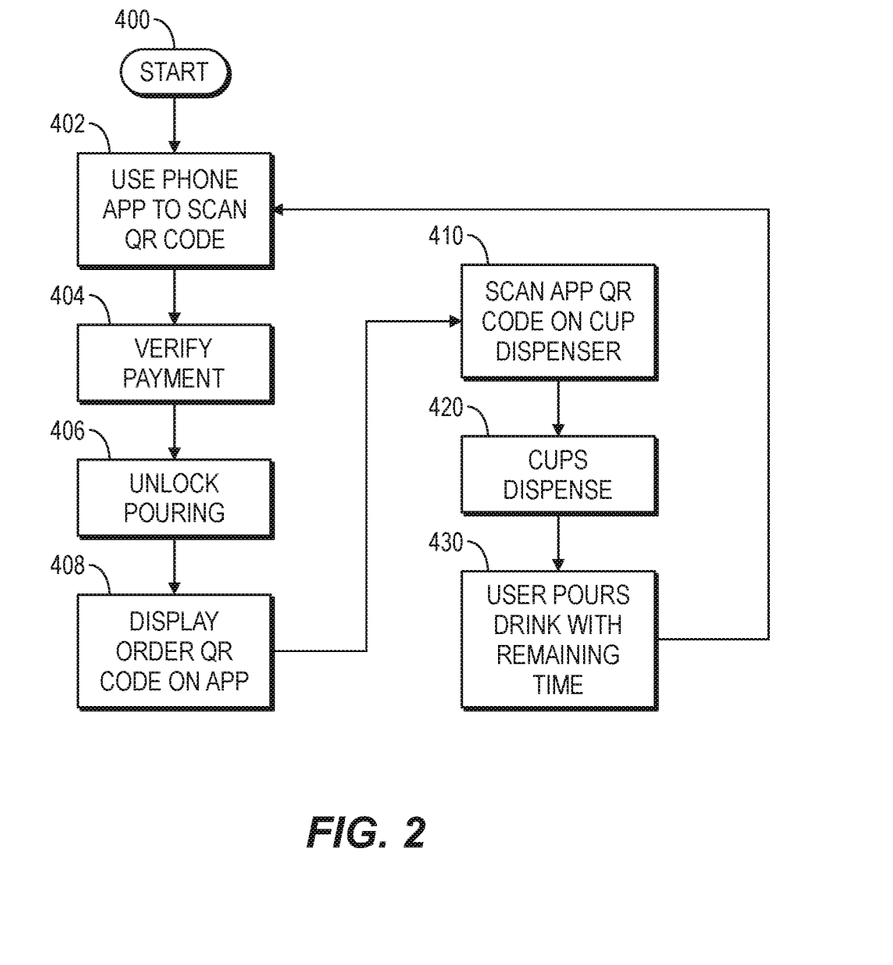
FIGS. 2-4 are flowcharts depicting exemplary methods for dispensing the cups and beverages shown in the system of FIG. 1.
Figure 3:
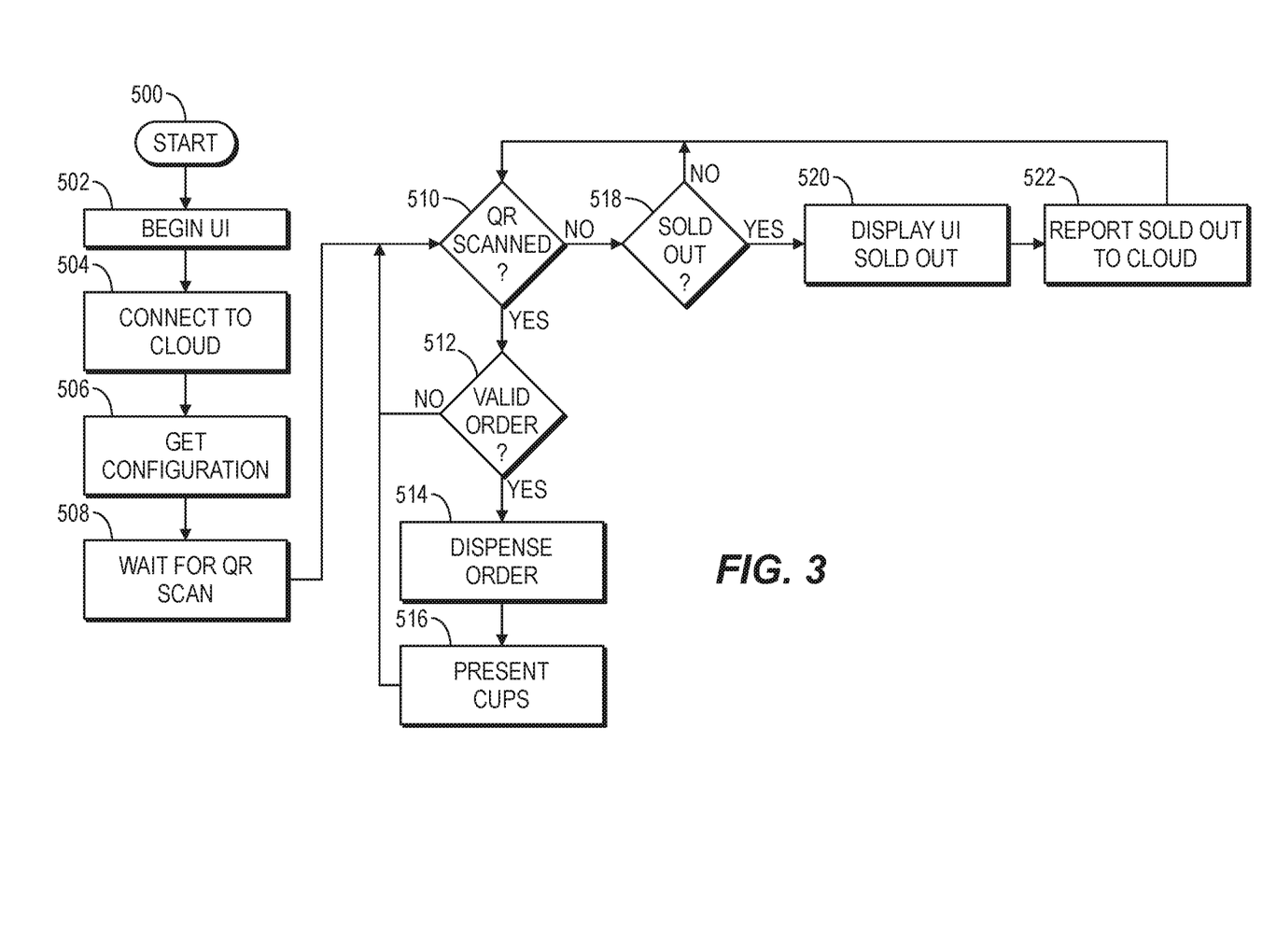
Figure 4:
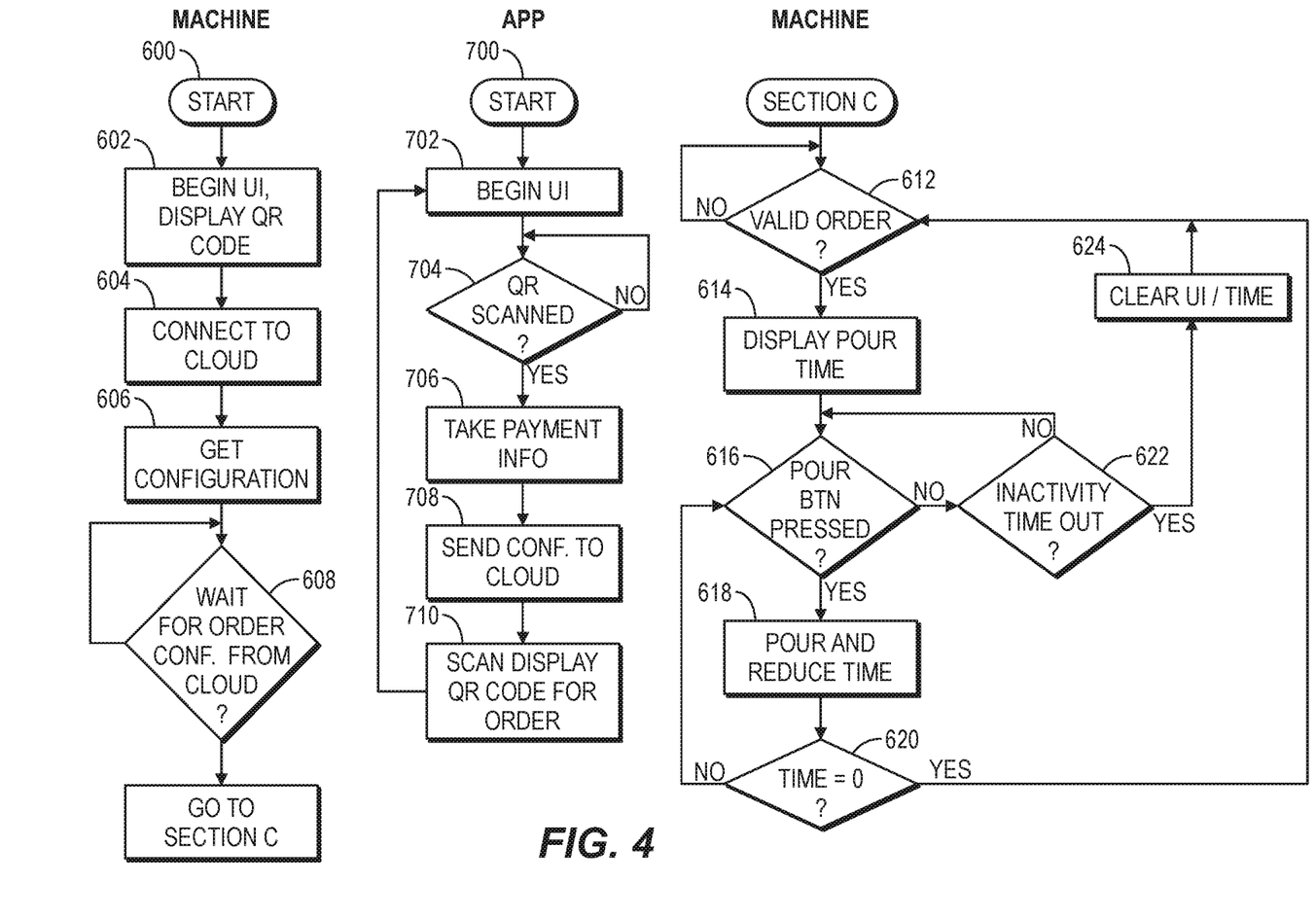

FIGS. 2-4 depict exemplary methods for purchasing a cup 40, dispensing the cup 40, and dispensing a beverage into the cup 40 according to the present disclosure. In FIG. 2, the method begins at step 400 by purchasing one or more beverages with the payment system 10. In some examples, the payment system 10 is unattended and allows beverages to be purchased with a mobile device 50 such as a smart phone, for example. In particular, an app 60 (FIG. 6) on the mobile device 50 may function as the payment system 10. In this example, the mobile device 50 may be taken to a cup dispensing machine 100 or other location, then used to scan an indicia thereon to initiate payment in step 402.

As with a standalone payment system 10 such as a traditional POS, the app 60 on the mobile device 50 then verifies the payment in step 404, such as by using Stripe or another third party smartphone-based payment service. A receipt 20 is also generated with this step, whether as a paper receipt 21, on the mobile device 50, and/or in a virtual format stored in the cloud 30, for example. This purchase may also be communicated with the beverage dispensing systems 300 to unlock pouring functionality corresponding to that purchase order in step 406. In certain examples, the purchased order is also displayed on the app 60, the user interface 110 of the cup dispensing system 100, and/or the user interface 310 on the beverage dispensing system 300 in step 408.

In the case in which the cup dispensing system 100, the beverage dispensing system 300, and/or the payment system 10 are distinct devices, the user then scans the proof of purchase 25 from the mobile device 50 (or paper receipt 21) using the input device 120 on the cup dispensing system 100 in step 410, allowing the cup dispensing system 100 to dispense the corresponding cups 40 in step 420. The customer is then permitted to fill the cups 40 at the beverage dispensing system 300, which was unlocked in step 406, in step 430. In certain examples, the customer is limited to a certain amount of time to fill each of the cups 40 in step 430. This may correspond to the combined volumes of the cups 40 purchased and the estimated fill rate of the beverage dispensing system 300.

FIG. 3 shows an exemplary method for dispensing cups 40 via the cup dispensing system 100 previously discussed, whether incorporated within the payment system 10 and/or beverage dispensing system 300, or as a separate and distinct device. A user interface 110 (FIG. 1) is displayed on the user interface 110 of the cup dispensing system 100 in step 502. The cup dispensing system 100 communicates with the cloud 30 to receive configurations of orders from the payment system 10 in step 506. These configurations of orders include a queue of purchases made by various customers, including different types, sizes, and quantities of cups 40 to be dispensed to each customer. The cup dispensing system 100 then waits in step 508 to scan an indicia, which in some cases will be a proof of purchase 25, using the input device 120. The cup dispensing system 100 then determines in step 512 whether the scanned indicia matches a proof of purchase 25 of a valid order purchased at the payment system 10, or whether the scanned indicia is unrelated to any proof of purchase 25, is voided, or is a counterfeit representation. If the order is not identified to be a valid match in step 512, the cup dispensing system 100 displays this status on the user interface 110 and waits for another indicia to be scanned. If the order is determined to be valid in step 512, the cup dispensing system 100 then dispenses the order in step 514.

Figure 7:
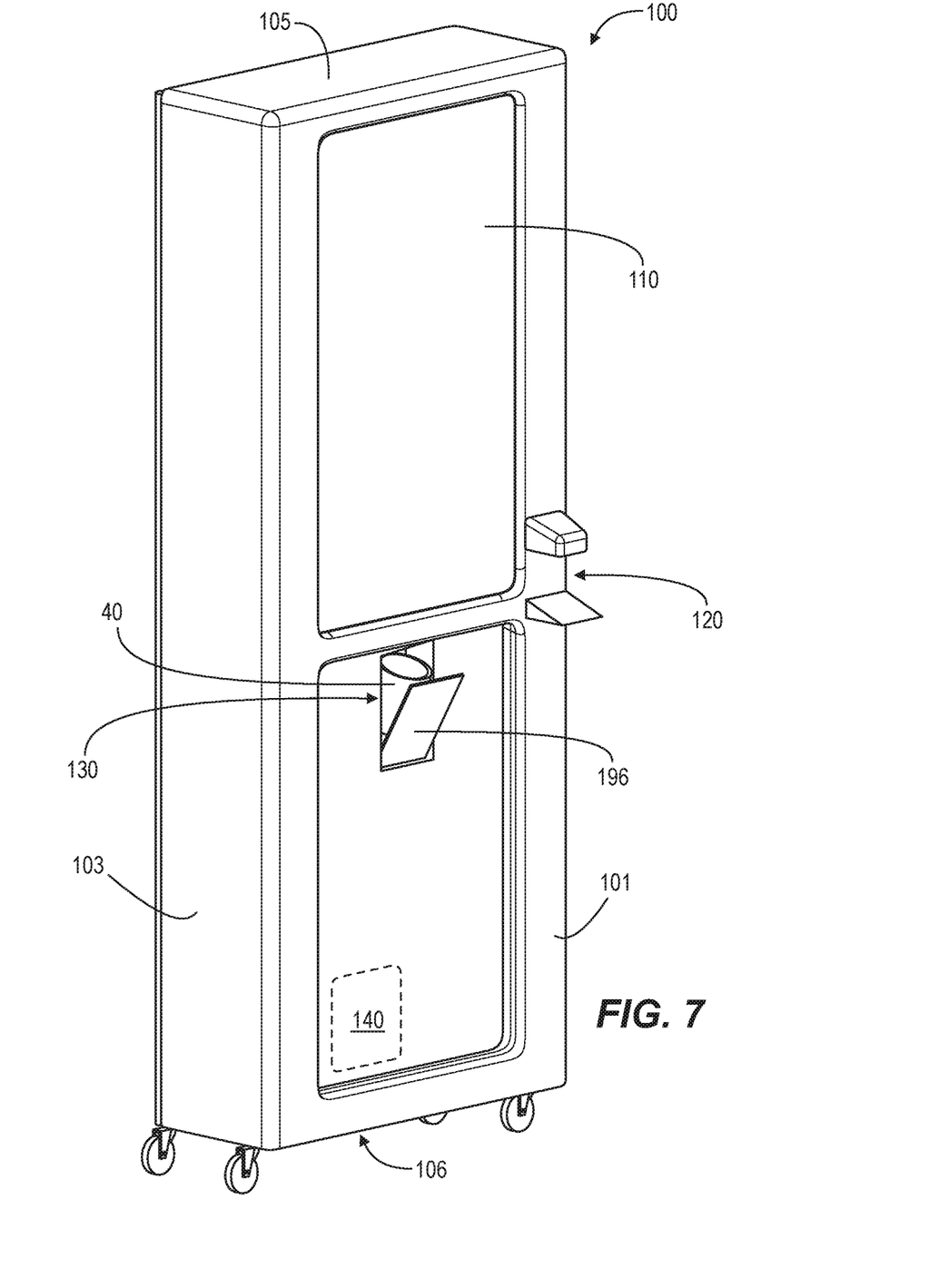
FIGS. 7 and 8 are perspective front views of an exemplary cup dispensing system shown with and without external covers, respectively.
Figure 8:
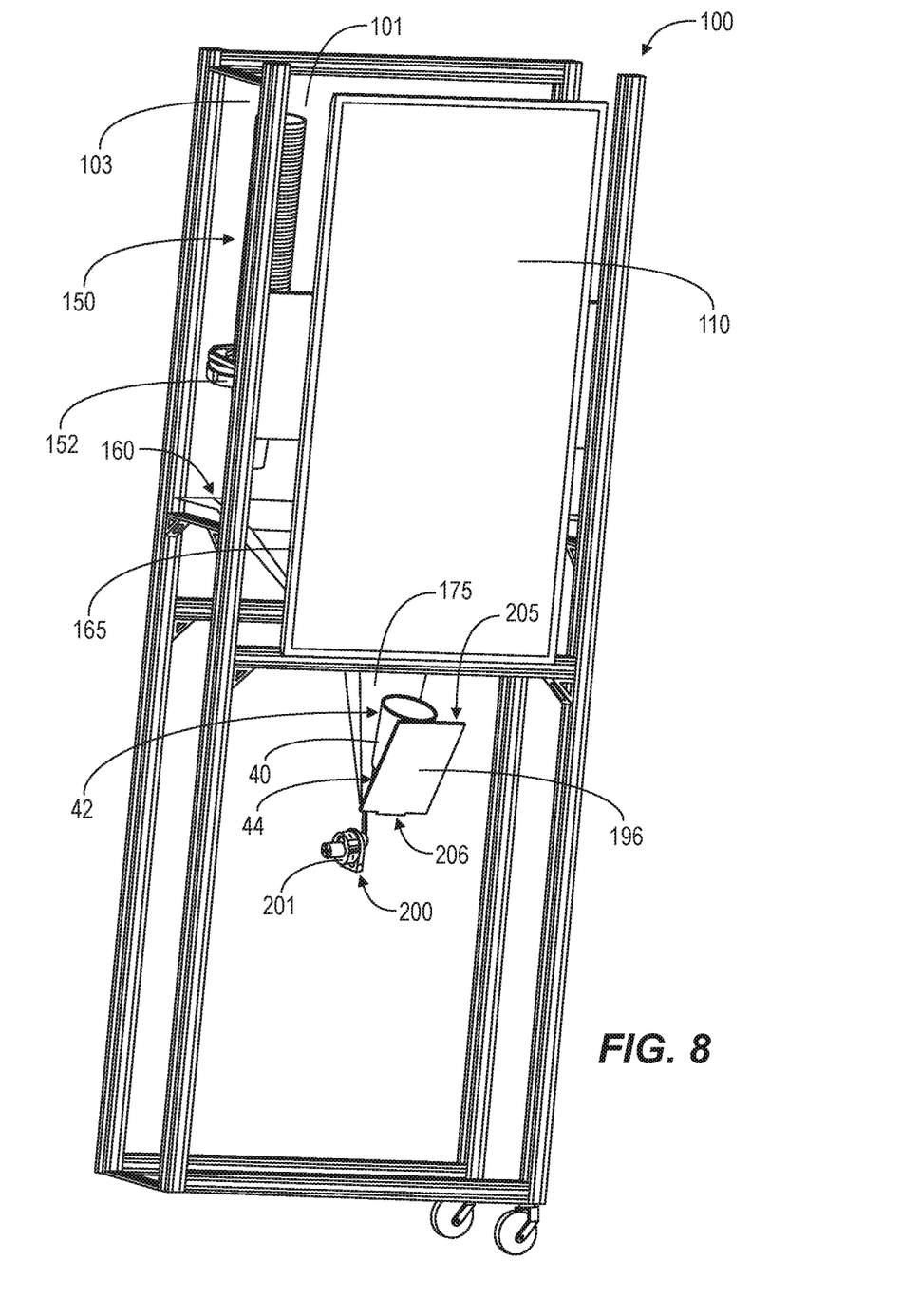

As will be discussed further below, the cup dispensing system 100 may be configured to dispense a variety of sizes of different cups 40, such as child, small, medium, large, and/or extra-large options. Different types of cups 40 may also be stored, such as wax-paper, plastic, and styrofoam, depending on the corresponding beverages being offered. In such cases, the cup dispensing system 100 may be further configured to dispense the cups 40 in a particular order so as to provide a minimum stacked height H (FIG. 1) of the cups 40 being dispensed. This not only provides for convenience and stability of the nesting cups 40 being presented to the customer, but also permits the maximum number of cups 40 to be dispensed from within the cup dispensing system 100 while still fitting through the door 196 (FIGS. 7 and 8). The present inventors have identified that in certain circumstances it is advantageous to dispense cups 40 in groups of no more than five.

In certain embodiments, the control system 140 analyzes the order to determine how many groups of cups 40 will be dispensed (e.g., such that no more than five cups 40 are dispensed at once). This may be an even distribution, or dispensing a maximum quantity until the entire order is dispensed, for example.

The control system 140 may, for each of the groups, start with the cup 40 having the widest bottom or base, working progressively to dispense narrower and narrower cups 40 therein. In other cases, the shapes of the cups 40 may provide that a shorter stack height arises by other sequences, for example if the cup 40 tapers inwardly at different rates. In certain embodiments, size and shape data is stored within the memory system 144 for each of the cups 40 stored in the storage chambers 150 such that the control system 140 may run iterations of sequences or otherwise mathematically solve for the sequence providing the smallest stacked height H. In certain embodiments, pre-optimized sequences are stored in a lookup table with the memory system 144 such that no solving is required by the control system 140. This may be particularly advantageous for the most common orders, such as two adult-sized beverages with one, two, three, or four kid-sized beverages, or two coffees and two water cups 40, for example.

The method of FIG. 3 is further configured to check whether any of the cup 40 offerings are sold out in step 518. If any cup 40 offerings are sold out, the status is displayed on the user interface 110 of the cup dispensing system 100 in step 520. In certain examples, an attendant is also notified to restock the cup dispensing system 100, such as by using $3^{rd}$ party equipment connected to the cloud 30 (step 522).

Figure 6:
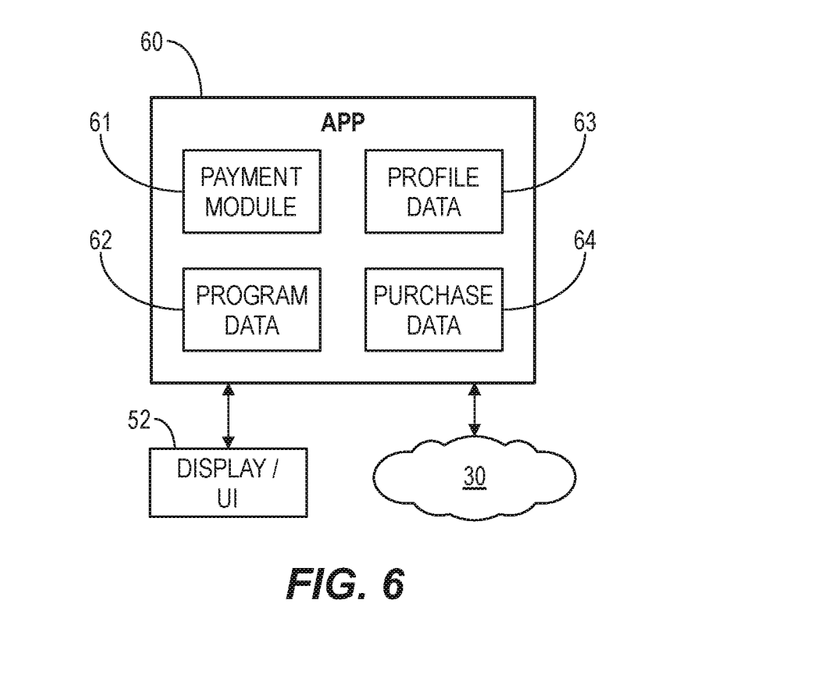

FIG. 4 depicts an exemplary method for operating a beverage dispensing system 300 similar to that shown in FIG. 1. The method 600 begins at the beverage dispensing system 300, whereby in step 602 the user interface 310 of the beverage dispensing system 300 displays an indicia 325 as previously discussed. The beverage dispensing system 300 also remains connected to the cloud 30, designated as step 604, to access and update records of purchase orders made or completed (i.e. dispensed), also including receiving configurations of cup 40 purchases in step 606 to be filled with beverage. The beverage dispensing system 300 then waits in step 608 for an order configuration to be received in or from the cloud 30, and for a beverage fill request to be initiated by a user. The steps performed by the beverage dispensing system 300 are then continued in section C also shown in FIG. 4, following execution of the method 700 initiated on the app 60 using the mobile device 50 (FIG. 6).

The method 700 of FIG. 4 is executed using the app 60 previously discussed, which begins in step 702 by the user engaging with the payment system 10 (whether alone, or in conduction with the cup dispensing system 100 and/or beverage dispensing system 300), for example by scanning an indicia to create the order. The app 60 then determines in step 704 whether a purchase request has been made, and if so collects payment information in step 706. The order information is then sent to the cloud 30 as a configuration of the cups 40 purchased in step 708. As previously discussed, the app 60 can then used to scan an indicia 325 displayed on a beverage dispensing system 300 in step 710 to initiate the beverage dispensing process.

Returning to discussion of the beverage dispensing system 300 (shown as Section C in FIG. 4), once the app 60 is used to scan the indicia 325 of the beverage dispensing system 300 in step 710, it is determined in step 612 whether there is valid order to be filled. As previously stated, the beverage dispensing system 300 may alternatively do the scanning of a receipt 20.

If a valid order is confirmed in step 612, the beverage dispensing system 300 in the present example then displays a pour time 614 available for each of the cups 40 corresponding to the order to be filled. The customer is then allowed to press pouring buttons in a customary manner, which if in step 616 is determined to be occurring results in pouring by the beverage dispensing system 300, while also reducing the pour time remaining in step 618. Once the remaining pour time is determined to be zero in step 620, the beverage dispensing system 300 stops dispensing as the order is then determined to be complete. Alternatively, if it is determined in step 620 that pour time is remaining, the user may continue to press pour buttons until no time remains. The exemplary method further includes an inactivity timeout in step 622, whereby inactivity occurs when the pour button is determined in step 616 to not being pressed. If an inactivity timeout is determined to occur at step 622 (for example, 30 seconds of inactivity), the user interface 312 and corresponding remaining time for the order may be cleared in step 624, whereby the beverage dispensing system 300 then awaits a valid order in step 612.

Figure 5:
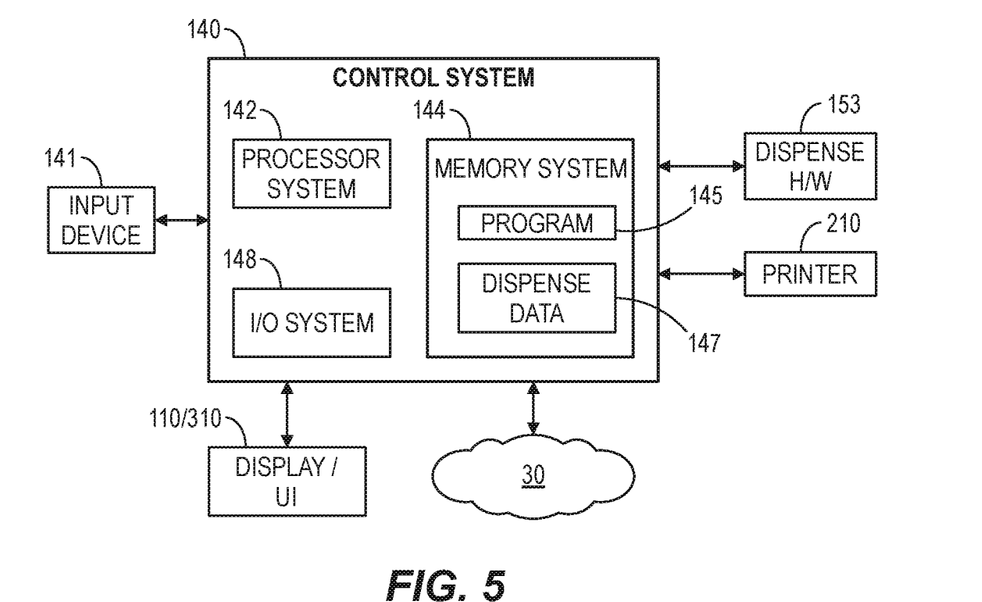
FIGS. 5 and 6 depict schematic views of an exemplary computer system and an exemplary app as incorporated within the devices shown in FIG. 1.

FIGS. 5 and 6 depict exemplary control systems 140 and apps 60 for executing the methods and using the systems according to the present disclosure. In the example shown, the control system 140 communicates with external devices, such as input devices 141 (e.g. an input device 120 of the cup dispensing system 100). The control system 140 further communicates with dispense hardware 153 (such as the tilting device 200 of FIG. 8, discussed below) as well as a receipt printer 210, the user interface (110/310), and/or the cloud 30.

Certain aspects of the present disclosure are described and depicted, including within FIGS. 5-6, in terms of functional and/or logical block components and various processing steps. It should be recognized that any such functional and/or block components and processing steps may be realized by any number of hardware, software, and/or firmware components configured to perform the specified functions. For example, certain embodiments employ various integrated circuit components, such as memory elements, digital signal processing elements, logic elements, look-up tables, or the like, which are configured to carry out a variety of functions under the control of one or more processors or other control devices. The connections between functional and logical block components are also merely exemplary. Moreover, the present disclosure anticipates communication among and between such components being wired, wireless, and through different pathways.

These functions may also include the use of computer programs that include processor-executable instructions, which may be stored on a non-transitory tangible computer readable medium. The computer programs may also include stored data. Non-limiting examples of the non-transitory tangible computer readable medium are nonvolatile memory, magnetic storage, and optical storage. As used herein, the term module may refer to, be part of, or include an application-specific integrated circuit (ASIC), an electronic circuit, a combinational logic circuit, a field programmable gate array (FPGA), a processor system (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors as a computer system may be stored by a single (shared) memory. The term group, as used above, means that some or all code comprising part of a single module may be executed using a group of processors. Likewise, some or all code comprising a single module may be stored using a group of memories as a memory system. Furthermore, certain elements are shown as singular devices for the sake of clarity, but may be combined or subdivided differently to perform the same function. For example, the processor system 142 shown may represent a group of microprocessors functioning as a system.

Within the control system 140 is a processor system 142 and memory system 144, which communicate with each other and to the external devices via an I/O system 148. In the example shown in FIG. 5, the memory system 144 stores a program 145 that is executable by the processor system 142, as well as dispense data 147. The program 145 includes executable instructions for communicating with the app 60, input and output devices, and also for performing the mechanical operations of the cup dispensing system 100. It should be recognized that a similar control system 140 would also be provided within the beverage dispensing system 300, as well as the payment system 10 (not shown). The dispense data 147 exemplarily includes data corresponding to particular orders, such as payment information, profile information for a given user, and/or purchase data, such as the size and quantity of cups corresponding to a particular order.

The program 145 further includes instructions for optimally nesting cups 40 so as to provide a minimum stacked height H for dispensing, based on the sizes and quantities of cups 40 available and ordered, and other physical constraints within the cup dispensing system 100, such as a height of the door 196 opening to present the cups 40 (FIG. 7).

As shown in FIG. 6, the exemplary app 60 is executable on a mobile device 50 and operable by the customer through the user interface 52 thereon. The app 60 includes a payment module 61, which incorporates payment services and/or communicates with such third party services as Stripe for allowing users to make mobile purchases using a linked account or credit card, for example. The app 60 further includes program data 62 for operating the app 60 and communicating between different inputs and outputs, such as the user interface 52 and the cloud 30. Profile data 63 is also stored within the app 60, such as information about a particular user, preferences, and stored favorites for repeat purchase orders. The app 60 further includes purchase data 64, which may store the sizes and quantities of cups 40 purchased and the corresponding status of dispensing and filling the cups 40. The data stored within the app 60 may be in addition to, or as an alternative to, data stored within the cloud 30.

In certain systems 1 according to the present disclosure, all information is transmitted via the app 60 rather than relying in part or in total on a cloud 30. In this case, purchase data 64 stored within the app 60 is used to communicate between the payment system 10, cup dispensing system 100, and/or beverage dispensing system 300 in the manner described herein.

FIGS. 7-11 depict an exemplary cup dispensing system 100 according to the present disclosure. The cup dispensing system 100 has a front 101 opposite a back (not shown) and sides 103 that extend between a top 105 and bottom 106. In the present example, the cup dispensing system 100 has casters for ease of transportation, such as in mobile configurations for festivals and the like. The cup dispensing system 100 includes a user interface 110, input device 120, and cup dispensing location 130 for dispensing the cups 40 as previously discussed. In the example shown, the cup dispensing system 100 includes a door 196 that is pivotable to present cups to the user upon dispensing, but to otherwise hide the tray 190 supporting the cups 40 (FIG. 11) and inner workings of the cup dispensing system 100. In particular, the tray 190 (FIG. 11) includes a floor 194 and lateral support 195 for holding the cup 40. The cup dispensing system 100 further incorporates a control system 140 therein as previously discussed.

Figure 9:
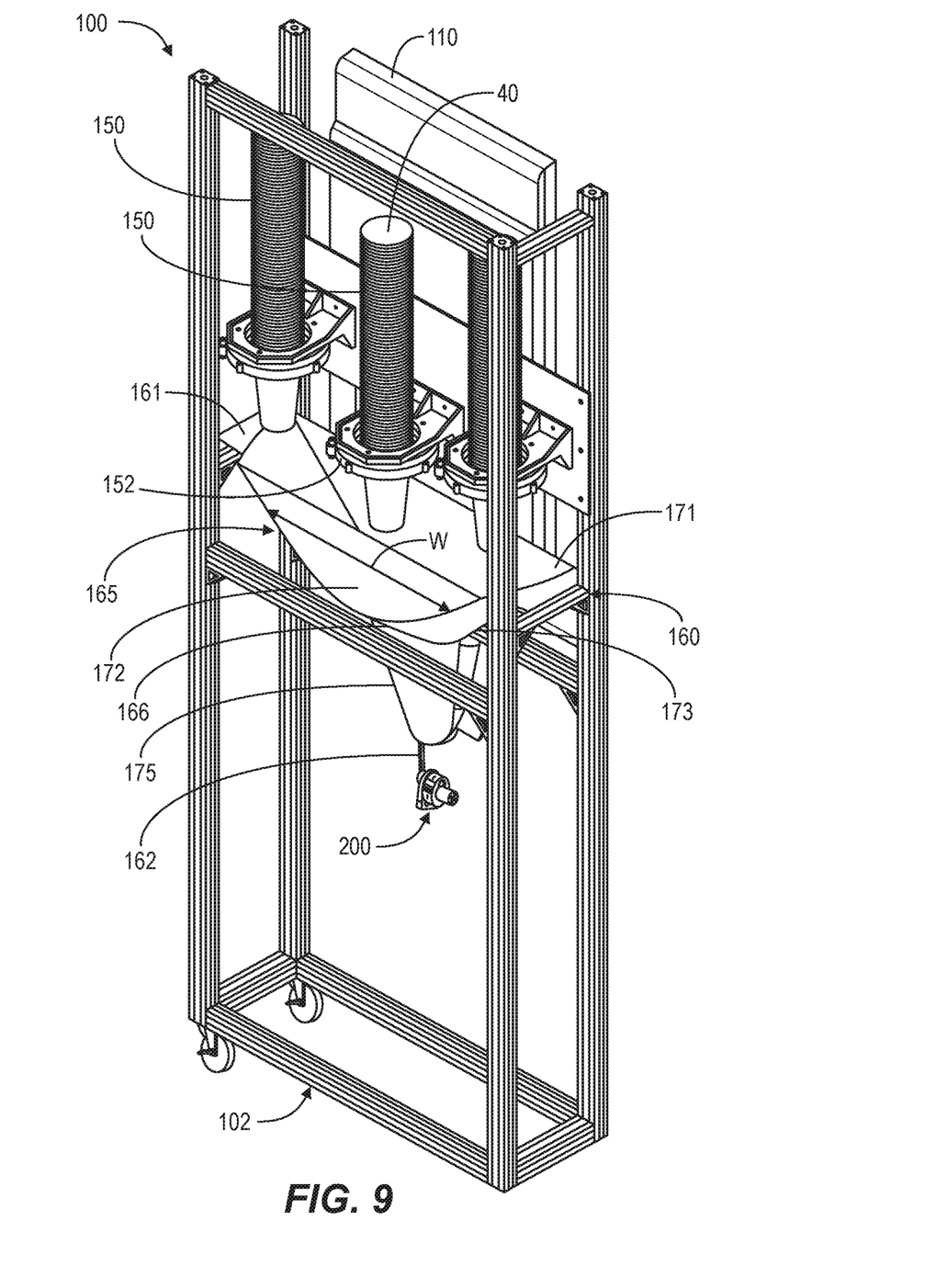
FIG. 9 is a back perspective view of the cup dispensing system shown in FIG. 8.

FIGS. 8-11 depict the cup dispensing system 100 without the covers shown in FIG. 7, revealing storage chambers 150 for storing the cups 40, in this example in vertical stacks. Each of the storage chambers 150 includes a release device 152 for selectively releasing cups 40 therefrom. Exemplary release devices 152 include the Series 674DC and Series 674AC Adjustable Plastic Cup Dispensers produced by Componenti Vending S.p.A. of Italy. In the configuration shown, cups 40 are released from the storage chamber 150 via the release device 152 to fall downwardly into a funnel 160 positioned below. As best shown in FIG. 9, the funnel 160 has an upper section 165 and lower section 175 that together extend between an upper end 161 and a lower end 162. The upper section 165 and lower section 175 meet at a transition 166 and have a front 171, a back 172, and sides 173 defining a width W therebetween.

Figure 10:
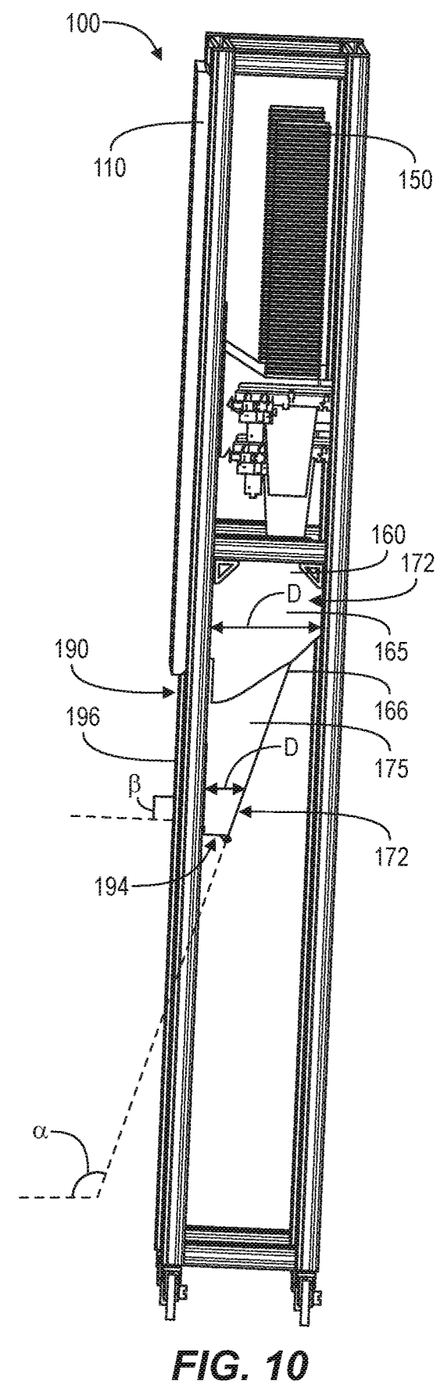
FIGS. 10 and 11 are side views of the cup dispensing system shown in FIG. 8 shown before and after presenting the dispensed cup to the user, respectively.
Figure 11:
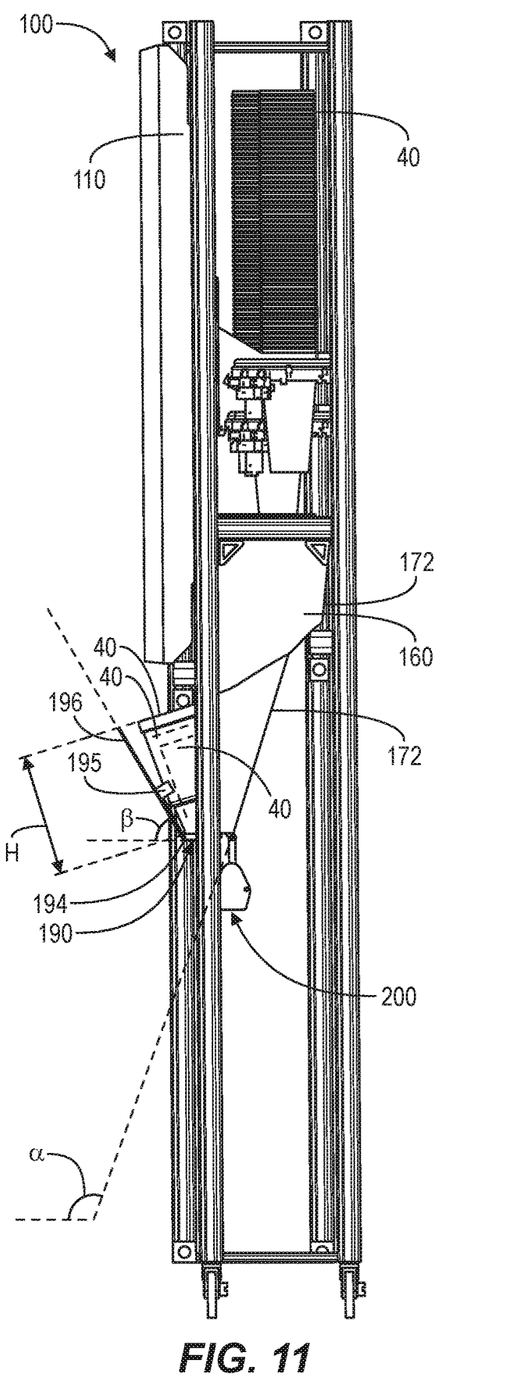

As best shown in FIGS. 10 and 11, the upper section 165 of the funnel 160 has a depth D that is greater than the depth D of the lower section 175, which tapers inwardly from the transition 166 to the lower end 162 (FIG. 9). The widths W (FIG. 9) also taper inwardly from the upper end 161 to the lower end 162. The back 172 of the lower section 175 is provided at an angle α relative to the horizontal plane, thereby causing the cups 40 to tip rearwardly as they rest upon the floor 194 of the tray 190 with the door 196 closed. A second angle β is defined between the door 196 and the horizontal plane, which is 90 degrees from horizontal when the door 196 is closed. Through experimentation and research, the present inventors have discovered that tilting the cups 40 rearwardly while releasing the cups 40 from the storage chambers 150 advantageously assists with the cups 40 properly nesting, rather than bouncing off each other upon release. In this manner, the cup dispensing system 100 dispenses the appropriate cups 40 from the variety of storage chambers 150, and in the appropriate order determined by the control system 140, such that the cups 40 are tilted rearwardly and nest having the minimum stacked height H possible.

Once the stacked height H is such that no additional cups 40 will fit through the cup dispensing location 130, the order is completed, or other limiting parameters are reached (such a predetermined maximum number of cups 40), the door 196 is tilted forwardly to present the cups 40 to the user, as shown in FIG. 11. In the example shown, the tray 190 and door 196 are tilted by a tilting device 200 that is powered by a motor 201. However, other examples of cup dispensing systems 100 may have other types of doors 196, including a manually opening door or dual-sliding doors, or no door at all.

Using the systems and methods previously described, the cup dispensing system 100 is able to dispense cups 40 to satisfy an order in a secure manner, and without requiring the assistance of an attendant.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

What is claimed is:

1. A dispensing system for dispensing containers, the dispensing system comprising:
    a storage chamber configured to hold the containers available for dispensing;
    a release device coupled to the storage chamber to release the containers therefrom;
    an input device configured to receive an order to dispense specific containers from the containers stored within the storage chamber, wherein the specific containers include at least two individual containers having different shapes;
    a tray that receives the specific containers released from the storage chamber, wherein the specific containers when released form a nested stack on the tray, and wherein the nested stack has a stacked height; and
    a control system operatively coupled to the input device and the release device, wherein the control system determines a sequence for dispensing the specific containers from the order so as to minimize the stacked height of the nested stack on the tray.

2. The dispensing system according to claim 1, further comprising a tilting device that tilts the tray between a first position for receiving the specific containers from the storage chamber, and a second position for subsequently presenting the container to a purchaser, wherein the nested stack has an upper end and a lower end, and wherein the upper end is tilted away from the dispensing device when the tray is tilted to the second position.

3. The dispensing system according to claim 1, further comprising an opening by which a purchaser accesses the nested stack after dispensing, wherein the opening has an opening height, and wherein the control system determines the sequence for dispensing the specific containers such that the stacked height is at most equal to the opening height.

4. The dispensing system according to claim 1, wherein the different shapes of first and second containers within the at least two individual containers include different widths such that the stacked height is greater when the first container is nested inside the second container relative to when the second container is nested inside the first container.

5. The dispensing system according to claim 1, wherein the containers available for dispensing include at least two containers made of different materials, respectively.

6. The dispensing device according to claim 1, further comprising a funnel that guides the specific containers between the release device and the tray, wherein the funnel has an upper end having an upper width and a lower end having a lower width, and wherein the upper width is greater than the lower width.

7. The dispensing device according to claim 6, wherein the funnel causes the upper end of each of the specific containers to be tilted rearwardly while being guided in the funnel.

8. The dispensing device according to claim 1, wherein the input device includes a camera.

9. The dispensing device according to claim 1, wherein the input device includes an RFID reader.

10. The dispensing device according to claim 1, wherein the control system controls the release device such that the nested stack is at most five individual containers.

11. A method for dispensing containers, the method comprising:
    storing containers available for dispensing within a storage chamber;
    operatively coupling a release device with the storage chamber to release the containers therefrom;
    providing an input device configured to receive an order to dispense specific containers from the containers stored within the storage chamber, wherein the specific containers include at least two individual containers having different shapes;
    providing a tray that receives the specific containers released from the storage, wherein the specific containers when released form a nested stack on the tray, and wherein the nested stack has a stacked height; and
    operatively coupling a control system to the input device and the release device, and configuring the control system to determine a sequence for dispensing the specific containers from the order to minimize the stacked height of the nested stack on the tray.

12. The method according to claim 11, further comprising coupling a tilting device to the tray, wherein the tilting device tilts the tray between a first position for receiving the specific containers from the storage chamber, and a second position for subsequently presenting the container to a purchaser, wherein the nested stack has an upper end and a lower end, and wherein the upper end is tilted away from the dispensing device when the tray is tilted to the second position.

13. The method according to claim 11, further comprising defining an opening by which a purchaser accesses the nested stack after dispensing, wherein the opening is defined to have an opening height, and further comprising configuring the control system to determine the sequence for dispensing the specific containers such that the stacked height is at most equal to the opening height.

14. The method system according to claim 11, wherein the different shapes of first and second containers within the at least two individual containers include different widths such that the stacked height is greater when the first container is nested inside the second container relative to when the second container is nested inside the first container.

15. The method according to claim 11, wherein the containers available for dispensing include at least two containers made of different materials, respectively.

16. The method according to claim 11, further comprising positioning a funnel between the release device and the tray to guide the specific containers therebetween, wherein the funnel has an upper end having an upper width and a lower end having a lower width, and wherein the upper width is greater than the lower width.

17. The method according to claim 16, wherein the funnel causes the upper end of each of the specific containers to be tilted rearwardly while being guided in the funnel.

18. The method according to claim 17, wherein the input device includes at least one of a camera, an NFC reader, and an RFID reader.

19. The method according to claim 11, further comprising configuring the control system to control the release device such that the nested stack is at most five individual containers.

20. A dispensing system for dispensing beverage cups, the dispensing device comprising:
- a storage chamber configured to hold the beverage cups available for dispensing;
- a release device coupled to the storage chamber to release the beverage cups therefrom;
- an input device configured to receive an order to dispense specific cups from the beverage cups stored within the storage chamber, wherein the specific cups include at least two individual cups having different heights;
- a tray that receives the specific cups released from the storage chamber, wherein the specific cups when released form a nested stack on the tray, wherein the nested stack has a stacked height, and wherein the nested stacked height varies depending on a sequence in which the specific cups are nested;
- a tilting device that tilts the tray between a first position for receiving the specific cups from the storage chamber, and a second position for subsequently presenting the specific cups to a purchaser, wherein the nested stack has an upper end and a lower end, and wherein the upper end is tilted away from the dispensing device when the tray is tilted to the second position;
- a funnel that guides the specific cups between the release device and the tray, wherein the funnel has an upper end having an upper width and a lower end having a lower width, and wherein the upper width is greater than the lower width, wherein the funnel causes the upper end of each of the specific cups to be tilted rearwardly while being guided in the funnel; and
- a control system operatively coupled to the input device and the release device, wherein the control system determines the sequence for dispensing the specific cups from the order so as to minimize the stacked height of the nested stack on the tray.

* * * * *